(12) United States Patent
Masaki

(10) Patent No.: US 9,541,897 B2
(45) Date of Patent: Jan. 10, 2017

(54) IMAGE FORMING APPARATUS HAVING SCANNING OPTICAL DEVICE

(71) Applicant: KYOCERA Document Solutions Inc., Osaka (JP)

(72) Inventor: Akihiro Masaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/034,334

(22) PCT Filed: Dec. 22, 2014

(86) PCT No.: PCT/JP2014/083832
§ 371 (c)(1),
(2) Date: May 4, 2016

(87) PCT Pub. No.: WO2015/114993
PCT Pub. Date: Aug. 6, 2015

(65) Prior Publication Data
US 2016/0259296 A1   Sep. 8, 2016

(30) Foreign Application Priority Data
Jan. 28, 2014   (JP) ................................ 2014-013142

(51) Int. Cl.
*G03G 15/04* (2006.01)
*G03G 21/00* (2006.01)
(Continued)

(52) U.S. Cl.
CPC ............... *G03G 21/20* (2013.01); *G02B 26/10* (2013.01); *G02B 26/12* (2013.01); *G02B 26/121* (2013.01);
(Continued)

(58) Field of Classification Search
CPC .............. G03G 15/04036; G03G 21/20; G03G 2215/04; G03G 2215/0402; G03G 2215/0404; G03G 15/04; G02B 26/10; G02B 26/12; G02B 26/121; G02B 26/124; H04N 1/00984; H04N 1/113
(Continued)

(56) References Cited

U.S. PATENT DOCUMENTS

| 6,980,340 | B1 | 12/2005 | Okura et al. |
| 7,394,582 | B2 | 7/2008 | Okura et al. |
| 2010/0033787 | A1* | 2/2010 | Serizawa ............... G02B 26/10 359/197.1 |

FOREIGN PATENT DOCUMENTS

| JP | 05-060991 A | 3/1993 |
| JP | H07-084205 A | 3/1995 |

(Continued)

OTHER PUBLICATIONS

International Search Report—PCT/JP2014/083832 mailed Feb. 3, 2015.
Written Opinion—PCT/JP2014/083832 mailed Feb. 3, 2015.

*Primary Examiner* — Sophia S Chen
(74) *Attorney, Agent, or Firm* — Studebaker & Brackett PC

(57) ABSTRACT

The scanning optical device (6) includes a light source, a deflector (30) configured to rotate on a horizontal surface around a rotating shaft extending in a vertical direction and an optical box (50) in which the light source, the deflector (30), and the optical components groups (40) are housed and supported by the frame (60). A heat sink (36) is disposed between the deflector (30) and the frame (60). A first protrusion (37) extending on an extension line of the rotating shaft of the deflector (30) is formed in the heat sink (36). A (Continued)

FORWARD AND REARWARD DIRECTIONS first engaging hole (61) with which the first protrusion (37) engages is formed in the frame (60).

12 Claims, 6 Drawing Sheets

(51) Int. Cl.
  *G02B 26/10* (2006.01)
  *G03G 21/20* (2006.01)
  *G02B 26/12* (2006.01)
  *H04N 1/113* (2006.01)
  *H04N 1/00* (2006.01)

(52) U.S. Cl.
  CPC .............. *G02B 26/124* (2013.01); *G03G 15/04* (2013.01); *G03G 15/04036* (2013.01); *H04N 1/00984* (2013.01); *H04N 1/113* (2013.01)

(58) Field of Classification Search
  USPC ...................... 399/4, 107, 118; 347/245, 263
  See application file for complete search history.

(56) References Cited

FOREIGN PATENT DOCUMENTS

| | | | |
|---|---|---|---|
| JP | H10-148783 | A | 6/1998 |
| JP | 2000-002854 | A | 1/2000 |
| JP | 2000-193904 | A | 7/2000 |
| JP | 2000-305035 | A | 11/2000 |
| JP | 2001-083448 | A | 3/2001 |
| JP | 2001-242408 | A | 9/2001 |
| JP | 2002-296532 | A | 10/2002 |
| JP | 2006-010814 | A  * | 1/2006 |
| JP | 2010-145874 | A | 7/2010 |
| JP | 2012-013220 | A | 1/2012 |

* cited by examiner

FORWARD AND REARWARD DIRECTIONS

FORWARD AND REARWARD DIRECTIONS

IMAGE FORMING APPARATUS HAVING SCANNING OPTICAL DEVICE

TECHNICAL FIELD

The present invention relates to an image forming apparatus including a scanning optical device configured to scan and expose laser light to a photosensitive drum.

BACKGROUND

An image forming apparatus is provided with a scanning optical device composed of a laser scanning unit (LSU) exposing laser light to a photosensitive drum to form an electrostatic latent image. The scanning optical device includes: a light source which emits laser light; a deflector which deflects the laser light; and optical components groups such as a lens or a mirror. The light source, the deflector, and the optical components groups are housed in an optical box which is mounted to a frame of the image forming apparatus.

The deflector has: a polygon mirror; a polygon motor which rotates and drives the polygon mirror; and the others. The optical box in which the deflector is housed is generally formed of a resin and is therefore easily thermally deformed by heating from the polygon mirror or the polygon motor rotating at a high speed. If the optical box may be thermally deformed, since positions of the optical components vary, a displacement in a main scanning direction and in a sub scanning direction occurs, causing degraded scanning precision.

Thus, in Patent Document 1, there is proposed a scanning optical device in which a sleeve provided on an extension line of a rotating shaft of a polygon mirror of a deflector is engaged with a hole formed in a frame of an image forming apparatus so as to thermally deform an optical box uniformly in a radiation direction around the sleeve. In this scanning optical device, even if the optical box is thermally deformed, since a relative positional relationship between the optical components is maintained, control to correct the amount of displacement is easily carried out, and intervals of color registration control against a color displacement can be extended.

Also, there is a problem that there may occur an image failure in which a fine striped pattern is printed, such as jitter or banding, due to rotary vibration exerted by a high speed rotation of the deflector (for example, 50,000 rpm).

As a countermeasure against such rotary vibration, in Patent Document 2, there is proposed a scanning optical device configured to add a counterweight to a rotating shaft of a polygon mirror and thus to displace a resonation point thereby to avoid resonation with an optical box. Also, in Patent Document 3, there is proposed a scanning optical device in which a stator yoke of a polygon motor is fixedly attached to a frame via a vibration suppression member. Further, in Patent Document 4, there is proposed a scanning optical device in which a deflector is disposed outside of a region surrounding a fixed point between an image forming apparatus and an optical box so as to easily attenuate the vibration.

PRIOR ART DOCUMENT

Patent Document

[Patent Document 1] Japanese Patent laid-open Publication No. 2010-145874

[Patent Document 2] Japanese Patent laid-open Publication No. 2001-83448

[Patent Document 3] Japanese Patent laid-open Publication H10-148783

[Patent Document 4] Japanese Patent laid-open Publication H07-84205

SUMMARY OF INVENTION

Problems to be Solved by the Invention

However, in the scanning optical device described in the Patent Document 1, since a substrate on which the deflector has been packaged is directly mounted to the optical box, a heat generated from the deflector is transmitted to the optical box to thermally deform the optical box easily and to increase an amount of thermal deformation. Therefore, there is a need to frequently carry out control to correct the amount of displacement.

In addition, in the scanning optical device described in the Patent Document 2, adding the counterweight causes an increase of weight and higher costs. Further, reinforcement against such increase of weight is required. In the scanning optical device described in the Patent Document 3, since the deflector is directly mounted to the frame via the vibration suppression member, the relative position precision between the optical components and the deflector is hardly obtained, and a dynamic position precision when the deflector is rotated is further hardly obtained. Further, in the scanning optical device described in the Patent Literature 4, there is a problem that a resonation phenomenon occurs if the number of rotations of the deflector is increased, and also there is a need to vary an arrangement depending upon a dimension or a shape of the image forming apparatus and thus the scanning optical device cannot be used in common.

The present invention has been made in view of the circumstance described above, and it is an object of the present invention to provide an image forming apparatus including a scanning optical device configured to reduce a thermal deformation of an optical box exerted by heating of a deflector so as to facilitate control of a scanning displacement and to be able to restrict vibration exerted by rotation of the deflector.

Means of Solving the Problems

An image forming apparatus according to the present invention includes a scanning optical device and a frame to which the scanning optical device is mounted. The scanning optical device has a light source; a deflector configured to rotate around a rotating shaft extending in a vertical direction to deflect light emitted from the light source; optical component groups configured to be disposed around the deflector and to focus the light deflected by the deflector on a surface of an image carrier; and an optical box in which the light source, the deflector, and the optical components groups are housed, the optical box being supported by the frame. A heat sink is disposed between the deflector and the frame. A first protrusion extending on an extension line of the rotating shaft of the deflector is formed in the heat sink. A first engaging hole with which the first protrusion engages is formed in the frame.

Effects of the Invention

According to the present invention, a thermal deformation of the optical box can be restricted by reducing an amount of heat generation of the deflector and the scanning optical device can be positioned in the frame of the image forming apparatus around the rotating shaft of the deflector. Accordingly, it is possible to provide an image forming apparatus including a scanning optical device configured to facilitate control of the scanning displacement. In addition, it is possible to provide an image forming apparatus configured to reduce vibration exerted by rotation of the deflector.

THE MODE FOR CARRYING OUT THE INVENTION

Hereinafter, with reference to figures, an image forming apparatus according to an embodiment of the present disclosure will be described.

First Embodiment

Figure 1:
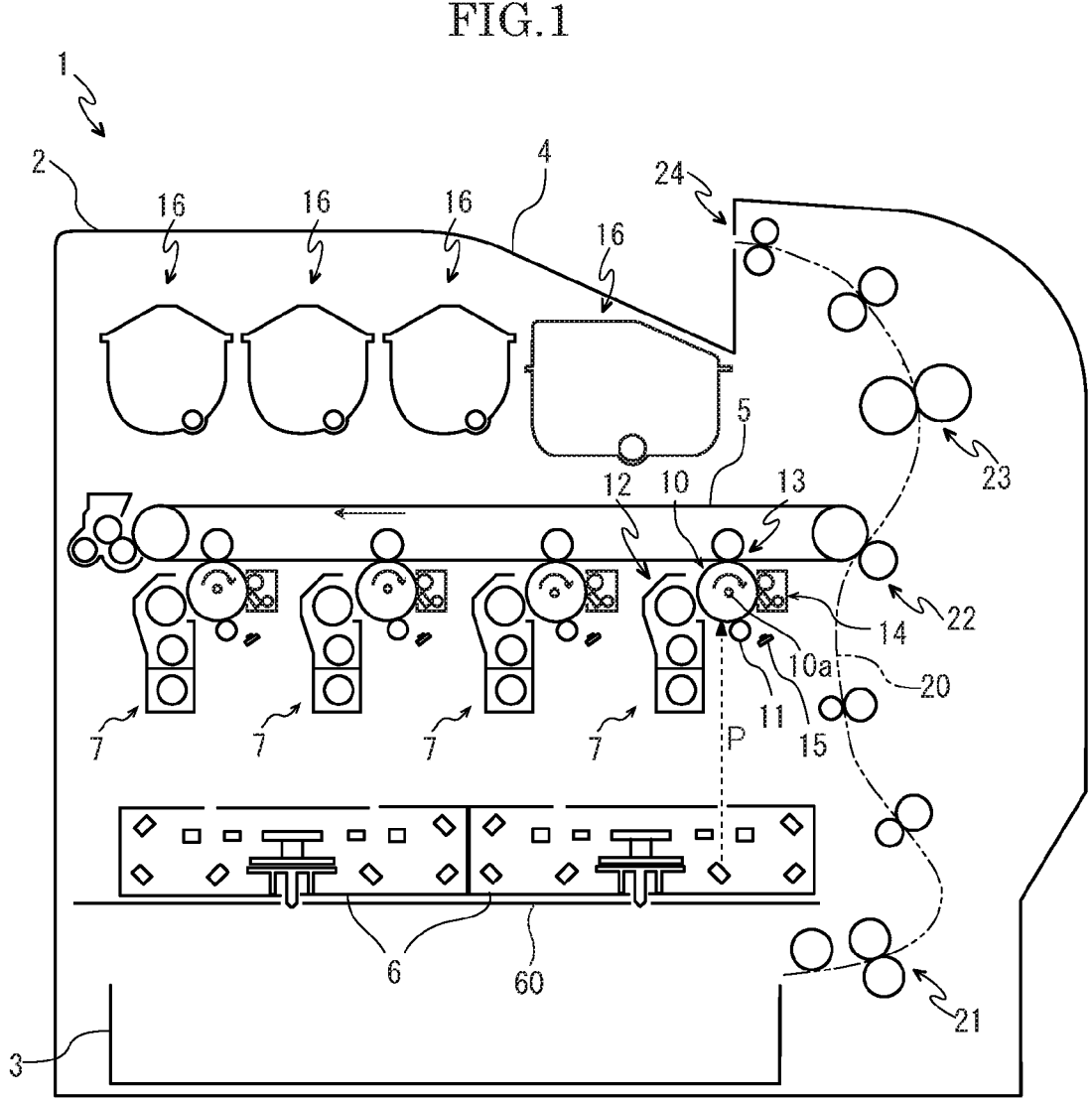
FIG. 1 is a schematic view showing a structure of a color printer according to a first embodiment of the present invention.

First, with reference to FIG. 1, the entire structure of a color printer 1 as an example of an electrographic image forming apparatus will be described. FIG. 1 is a schematic diagram schematically showing a color printer according to one embodiment of the present disclosure. In the following description, a left side in FIG. 1 shows a front side of the printer 1 and directions perpendicular to the forward and rearward directions seen from the front side show left and right directions.

The color printer 1 includes a box-like formed printer main body 2, a sheet feeding cassette 3 storing sheets (not shown) is provided in a lower part of the printer main body 2 and an ejected sheet tray 4 is formed on an upper end of the printer main body 2.

In an upper part of the printer main body 2, an intermediate transferring belt 5 is bridged between a plurality of rollers, and under the intermediate transferring belt 5, two scanning optical devices 6 each composing of a laser scanning unit (LSU) are arranged side by side in the forward and rearward directions. Along a lower face of the intermediate transferring belt 5, a plurality of image forming parts 7 are provided. Each image forming part 7 corresponds to color of yellow (Y), magenta (M), cyan (C) and black (K), respectively. In each image forming part 7, a photosensitive drum 10 is supported rotatably around a supporting shaft 10a. Around the photosensitive drum 10, a charger 11, a development unit 12, a first transferring part 13, a cleaning device 14 and a static eliminator 15 are arranged along a rotation direction (referred to an arrow in FIG. 1) of the photosensitive drum 10. Above each development unit 12, a developer container 16 is provided.

In the rear part of the printer main body 2, a sheet conveying path 20 is provided. At an upstream end of the conveying path 20, a sheet feeding part 21 is provided. At a midstream portion of the conveying path 20, a second transferring part 22 is provided on the back side of the intermediate transferring belt 5. At a downstream portion of the conveying path 20, a fixing device 23 is provided and, at a downstream end of the conveying path 20, a sheet ejecting port 24 is provided.

Next, the operation of forming an image by the color printer 1 having such a configuration will be described.

When a power is applied to the color printer 1, various parameters are initialized and then an initializing such as a temperature setting of the fixing device 23 is carried out. Then, when image date is inputted from a computer or the like connected to the color printer 1 and a print start is instructed, an image forming operation is carried out according to the following processes.

First, a surface of the photosensitive drum 10 is electrically charged by the charger 11 and then is exposed in accordance to the image data with a laser light (refer to an arrow P) by the two scanning optical device 6 to form an electrostatic latent image on the surface of the photosensitive drum 10. The electrostatic latent image is then developed into a toner image of corresponding color by the development unit 12. The toner image is first-transferred to a surface of the intermediate transferring belt 5 at the first transferring part 13. The above process is carried out every image forming part 7 to form a full color toner image on the intermediate transferring belt 5. The toner remained on the intermediate transferring belt 5 is removed by the cleaning device 14 and the remaining charge is eliminated by the eliminator 15.

On the other hand, the sheet fed from the sheet feeding cartridge 3 or a bypass tray (not shown) is conveyed to the second transferring part 22 synchronously with the above-mentioned image forming process, and the full color toner image on the intermediate transferring belt 5 is second-transferred on the sheet at the second transferring part 22. The sheet on which the toner image has been second-transferred is conveyed downwardly along the conveying path 20 to enter the fixing device 23. At the fixing device 23, the toner image is fixed on the sheet. The sheet with the fixed toner image is ejected into the ejected sheet tray 4 through the sheet ejecting port 24.

Figure 2:
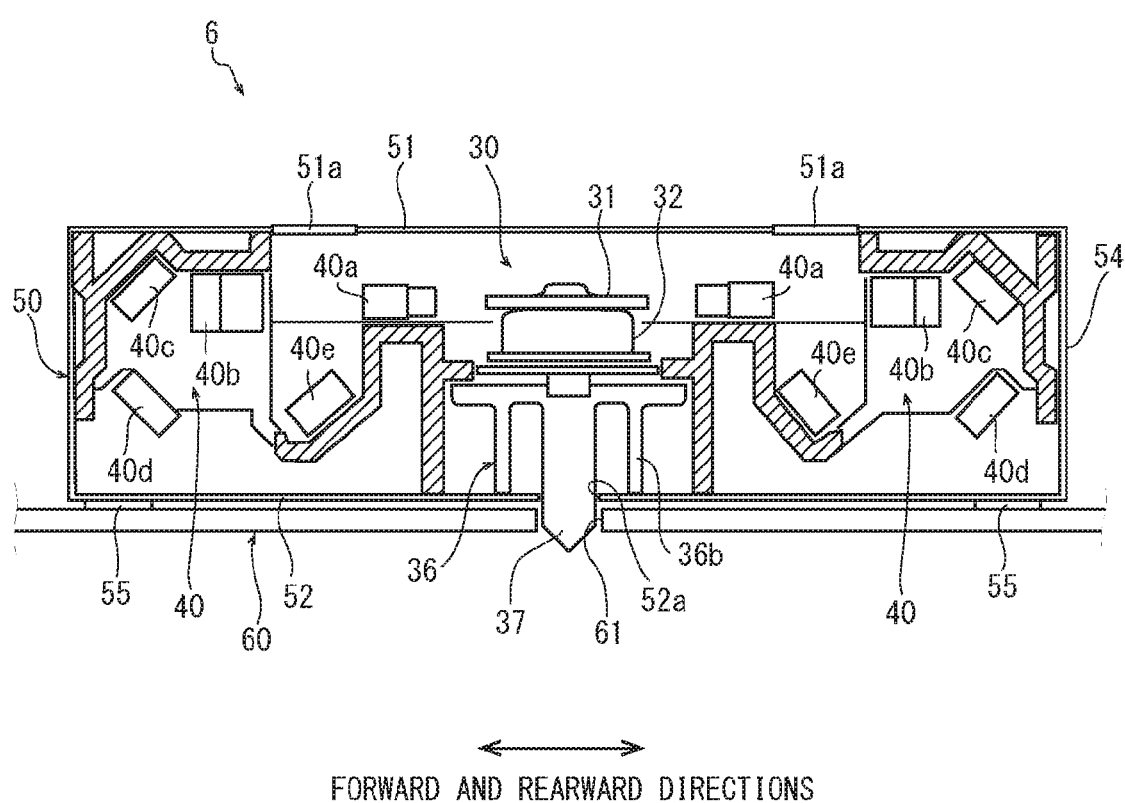
FIG. 2 is a sectional side view showing a scanning optical device of the color printer according to the first embodiment of the present invention.
Figure 3:
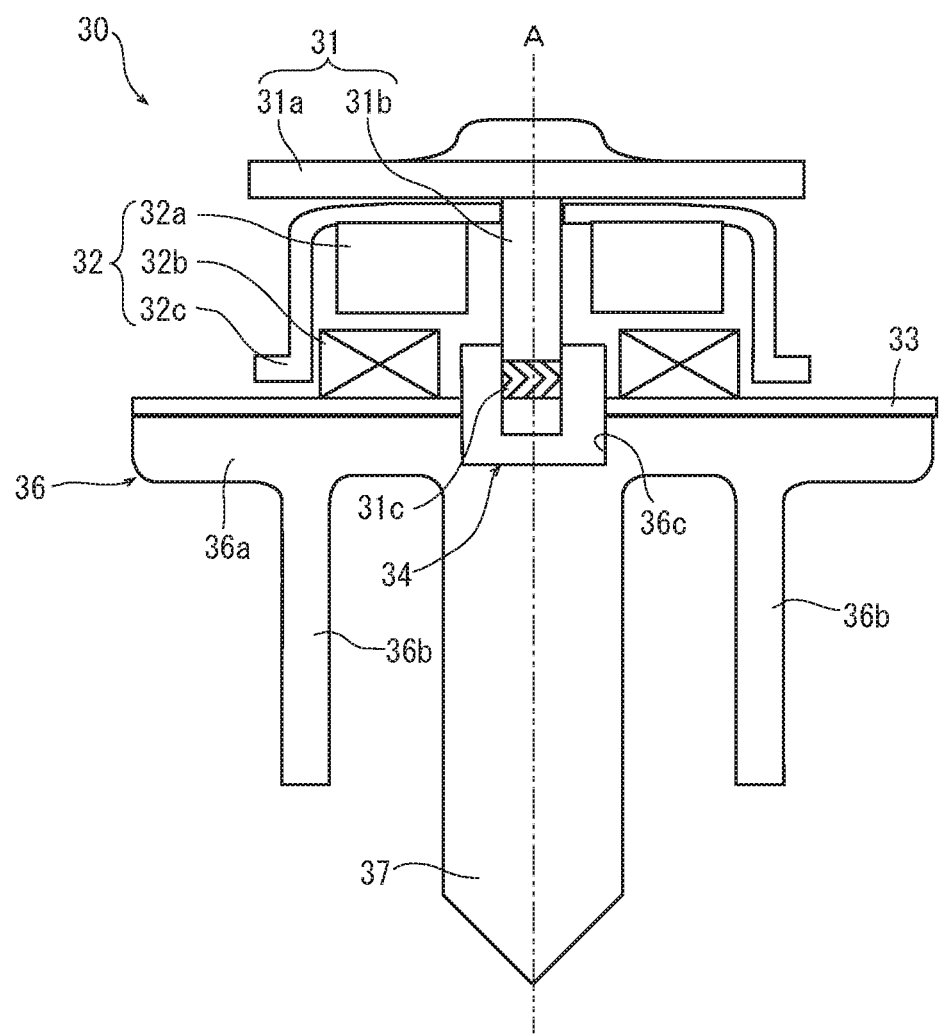
FIG. 3 is a sectional side view showing a deflector of the scanning optical device of the color printer according to the first embodiment of the present invention.
Figure 4:
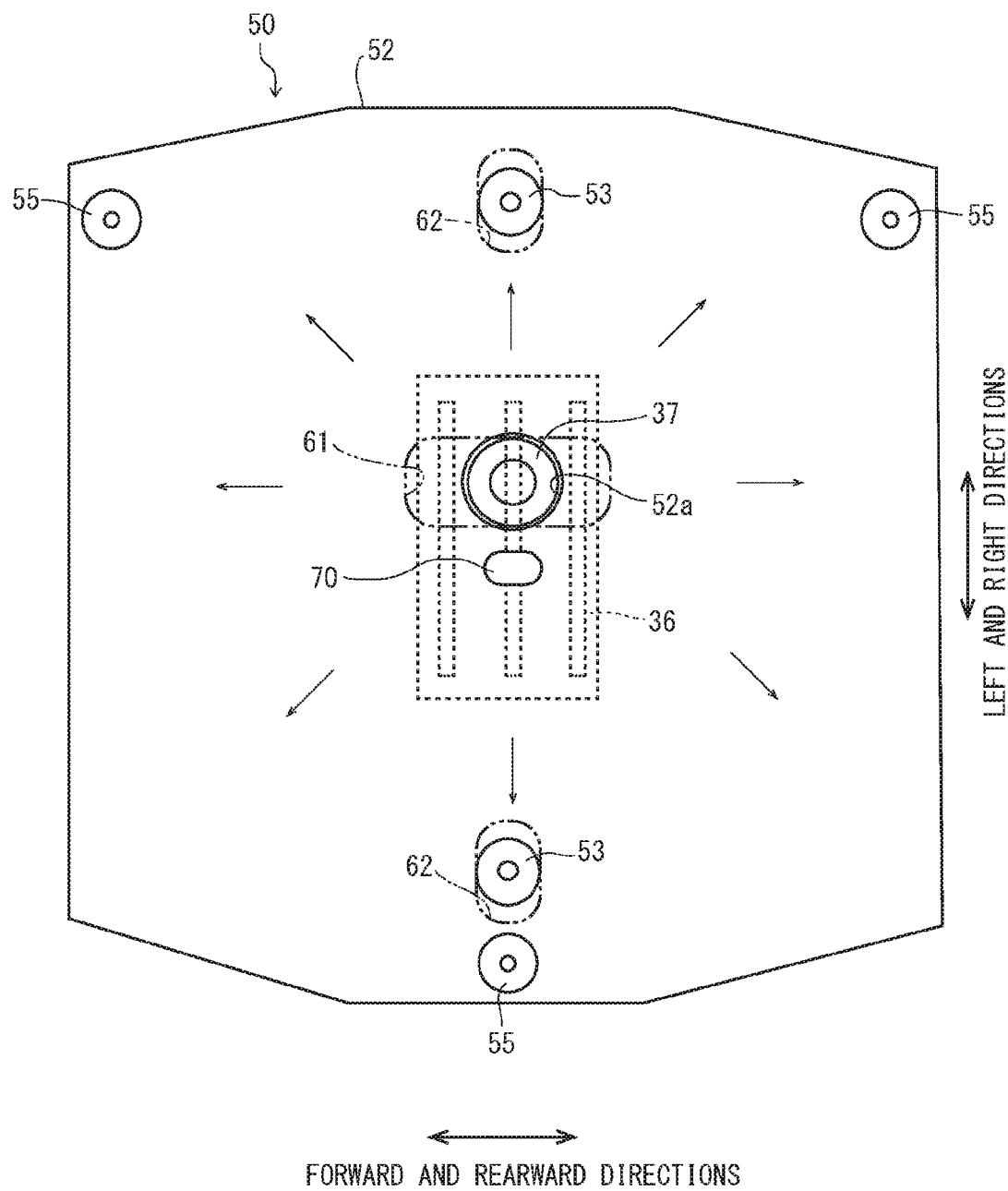
FIG. 4 is a bottom view of an optical box of the scanning optical device of the color printer according to the first embodiment of the present invention.

Next, with reference to FIGS. 2 to 4, the scanning optical device 6 will be described. FIG. 2 is a side view schematically showing the scanning optical device; FIG. 3 is a side view showing a deflector of the scanning optical device; and FIG. 4 is a bottom view of an optical box of the scanning optical device.

The scanning optical device 6 is mounted to a frame 60 extending horizontally under the image forming parts 7 inside of the printer main body 2 (refer to FIG. 1).

The scanning optical device 6 is configured to scan laser light in a main scanning direction orthogonal to a traveling direction of the intermediate transferring belt 5, and has: two light sources (not shown); a deflector 30; a pair of optical components groups 40; and an optical box 50 in which the light sources, the deflector 30, and the optical components groups 40 are housed.

The deflector 30 is disposed near a center of the optical box 50. The pair of optical components groups 40 are symmetrically disposed in the forward and rearward direction around the deflector 30. The two light sources are disposed on one side of the deflector 30.

The light sources are laser oscillators which radiate laser light, and emit the laser light to the deflector 30 via a collimator lens and a cylindrical lens (not shown).

As shown in FIG. 3, the deflector 30 deflects the laser light emitted from the light sources, has a polygon mirror 31 and a polygon motor 32 which rotates the polygon mirror 31, and is supported by a substrate 33.

The polygon mirror 31 has: a mirror main body 31a which is a polygonal surface mirror having a regular polygon planar shape; and a rotating shaft 31b extending in a vertical direction and formed at a center of the mirror main body 31a. The polygon motor 32 has a driving magnet 32a and a coil 32b opposing to the driving magnet 32a. The driving magnet 32a is secured to a rotor 32c, and the rotor 32c is secured to the rotating shaft 31b of the polygon mirror 31. If the coil 32b is energized, the rotating shaft 31b rotates together with the rotor 32c so that the mirror 31a rotates on a horizontal surface.

A lower end of the rotating shaft 31b of the polygon mirror 31 is rotatably engaged with a sleeve 34 acting as a dynamic fluid bearing. On an outer circumferential face of the lower end of the rotating shaft 31b, a herringbone-shaped shallow groove 31c for generation of a dynamic pressure is processed.

The substrate 33 has a rectangular planar shape. The deflector 30 is disposed at a position close to one end of an upper face of the substrate 33, and the sleeve 34 is caulked and secured to the substrate 33. Electrical parts such as resistors and capacitors constituting a control circuit of the polygon motor 32 and connectors or the like are packaged on another portion of the upper face of the substrate 33.

The deflector 30 is attached to a heat sink 36. The heat sink 36 has: a top plate 36a in a rectangular planar shape; and a plurality of fins 36b extending downward from a back face of the top plate 36a. The substrate 33 is placed on the top plate 36a and then is screwed at a plurality of positions. The fins 36b are plate-shaped members, and are disposed in parallel to each other at predetermined intervals on the top plate 36a.

On the back face of the top plate 36a of the heat sink 36, a first protrusion 37 is formed extending downward. The first protrusion 37 is formed so as to extend on the same axis A as the rotating shaft 31b of the polygon mirror 31 of the deflector 30 and has a cylindrical shape of a length longer than a length of the fin 36b. A shallow hole 36c with which the sleeve 34 of the deflector 32 engages is formed on the top plate 36a above the first protrusion 37.

As shown in FIG. 2, the optical components groups 40 are configured to focus the laser light deflected by the deflector 30 on a photosensitive drum 10; have a first Fθ lens 40a, a second Fθ lens 40b, a first mirror 40c, a second mirror 40d, and a third mirror 40e; and are supported at a predetermined position in the optical box 50.

The optical box 50 is a shallow box-shaped member having a rectangular planar shape, and includes of a top plate 51, a bottom plate 52, and side plates 54. The optical box 50 is made of a resin.

In the top plate 51 of the optical box 50, windows 51a through which the laser lights emitted from the respective optical components groups 40 to the photosensitive drum 10 passes are formed.

As shown in FIG. 4, near a center of the bottom plate 52 of the optical box 50, a hole 52a through which the first protrusion 37 of the heat sink 36 is to be inserted is punched. Further, on a back face of the bottom plate 52, two columnar second protrusions 53 protruding downward are formed. The respective second protrusions 53 are disposed on an extension line extending in the main scanning direction and passing through the hole 52a and on the both left and right side ends sandwiching the hole 52a.

The first protrusion 37 and the second protrusion 53 respectively engage with a first engaging hole 61 and a second engaging holes 62 formed in the frame 60.

The first engaging hole 61 is formed in a long hole elongated in a direction (forward and rearward directions) orthogonal to the main scanning direction (left and right directions). A width in a shorter direction of the first engaging hole 61 is a length obtained by adding an appropriate fitting tolerance to a diameter of the first protrusion 37. The second engaging hole 62 is formed in a long hole elongated in a direction orthogonal to a longer direction of the first engaging hole 61. A width in a shorter direction of the second long hole 62 is a length obtained by adding an appropriate fitting tolerance to a diameter of the second protrusion 53.

On the back face of the bottom plate 52 of the optical box 50, three abutment parts 55 abutting against the frame 60 are formed. The abutment parts 55 are disposed at a front left corner, a rear left corner and near a center of the right edge of the back face of the bottom plate 52. Each of the abutment parts 55 is formed in a disk shape, and is thinner than heights of the first protrusion 37 and the second protrusions 53. At a center of the abutment part 55, a hole through which a screw is to be inserted when secured to the frame 60 is punched.

Under the heat sink 36, between the bottom plate 52 of the optical box 50 and the frame 60, an elastic member 70 is interposed. The elastic member 70 is a small piece of an approximately the same thickness as an interval between the frame 60 and the bottom plate 52 of the optical box 50. As the elastic member 70, a vibration-proof rubber can be used. As a material for the vibration-proof rubber, a butyl rubber having a comparatively high rubber hardness of 60 degrees to 90 degrees can be used.

In a case where the scanning optical device 6 including the construction mentioned above is mounted to the frame 60, the first protrusion 37 of the optical box 50 is engaged with the first engaging hole 61 of the frame 60, and the second protrusions 53 are engaged with the second engaging holes 62. By doing so, the optical box 50 abuts against the frame 60 by the abutment parts 55, and the first protrusion 37 and the second protrusions 53 protrude downward from the frame 60.

At this time, since the first protrusion 37 is unmovable in the main scanning direction with respect to the first engaging hole 61, the optical box 50 is positioned in the frame 60 with respect to the main scanning direction. Also, since the second protrusions 53 each are unmovable in a direction orthogonal to the main scanning direction with respect to the second engaging hole 62, the optical box 50 is positioned in the frame 60 with respect to the direction orthogonal to the main scanning direction. Therefore, the scanning optical device 6 is configured to be positioned in the main scanning direction and in the direction orthogonal to the main scanning direction with respect to the frame 60 around the rotating shaft 31b of the polygon mirror 31 of the deflector 30 on the extension line of the first protrusion 37.

On the other hand, in the height direction, by each abutment parts 55, the scanning optical device 6 is positioned in the height direction with respect to the frame 60.

As described above, with the scanning optical device 6 of the color printer 1 according to the first embodiment of the present invention, when the color printer 1 is activated and then the deflector 30 is heated, an amount of the generated heat is radiated from the heat sink 36 via the substrate 33. At this juncture, since the first protrusion 37 provided integrally with the heat sink 36 protrudes from the frame 60 through the bottom plate 52 of the optical box 50, the heat is radiated through the protrusion 37 to the outside of the frame 60 as well. Therefore, a large amount of generated heat can be radiated via the heat sink 36 so that an amount of generated heat transmitted to the optical box 55 decreases and therefore a thermal deformation of the optical box 50 can be restricted.

Also, in a case where the optical box 50 is thermally deformed, since the optical box is deformed uniformly in a radiation direction around the first protrusion 37, that is, around the rotating shaft 31b of the polygon mirror 31 (refer to the arrows of FIG. 4), relative positions of the lenses or mirrors constituting the optical components groups 40 do not vary. Therefore, the displacement amounts in the main scanning direction and in the direction orthogonal to the main scanning direction becomes uniform so that control of the scanning displacement can be precisely carried out and the intervals of color registration can be extended.

Further, according to the scanning optical device 6 of the color printer 1 of the present invention, since vibration transmitted to the heat sink 36 from the deflector 30 that is a source of vibration can be absorbed by the elastic member 70, vibration of the optical box 50 can be restricted and degradation in the scanning precision can be prevented. In detail, since the elastic member 70 is disposed inside of a triangular region connecting centers of the three abutment parts 55, in other words, since the elastic member 70 is disposed in a region which is an antinode of vibration of the optical box 50, the vibration can be effectively restricted.

Although, in the embodiment, the first engaging hole 61 is formed in a long hole elongated in the direction orthogonal to the main scanning direction, the first engaging hole can be formed in a long hole elongated in the main scanning direction. In this case, the second protrusion 53 is disposed on the extension line extending in the direction orthogonal to the main scanning direction and passing through the first protrusion 37, and the second engaging hole 62 is formed in a long hole elongated in the direction orthogonal to the main scanning direction.

Although, in the embodiment, the first protrusion 37 and the second protrusions 53 are respectively formed in the optical box 50 and the first engaging hole 61 and the second engaging holes 62 are formed in the frame 60, the first protrusion 37 and the second protrusions 53 may be respectively formed in the frame 60 and the first engaging hole 61 and the second engaging holes 62 may be formed in the optical box 50.

Although, in the embodiment, a vibration-proof rubber having a high rubber hardness is used as the elastic member 70, if a material having a high thermal conductivity is used, since the heat transmitted from the heat sink 36 to the bottom plate 52 of the optical box 50 is radiated to the frame 60 via the elastic member 70, an amount of generated heat transmitted to the optical box 50 can be further reduced.

Second Embodiment

Figure 5:
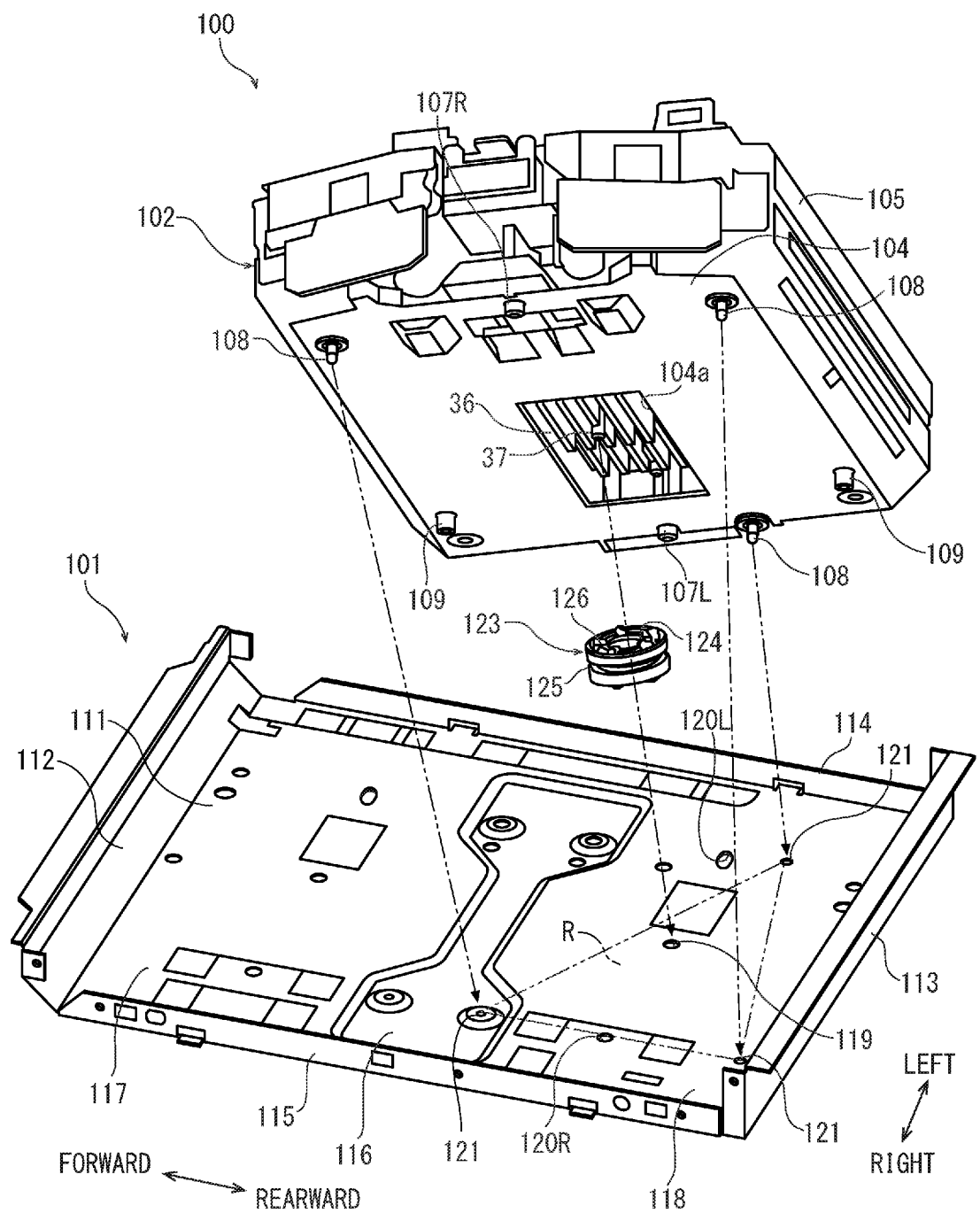
FIG. 5 is a perspective view showing a scanning optical device and a frame of a color printer according to a second embodiment of the present invention.

Next, a scanning optical device of a color printer as an image forming apparatus according to a second embodiment of the present invention will be described with reference to FIGS. 5 to 6. FIG. 5 is a perspective view showing a scanning optical device and a frame and FIG. 6 is a sectional side view of the scanning optical device.

Two scanning optical devices 100, as shown in FIG. 5 (only one is shown in FIG. 5), are mounted side by side in the forward and rearward directions to a frame 101 extending in the forward and rearward directions under the image forming parts 7 in the printer main body 2 (refer to FIG. 1).

Figure 6:
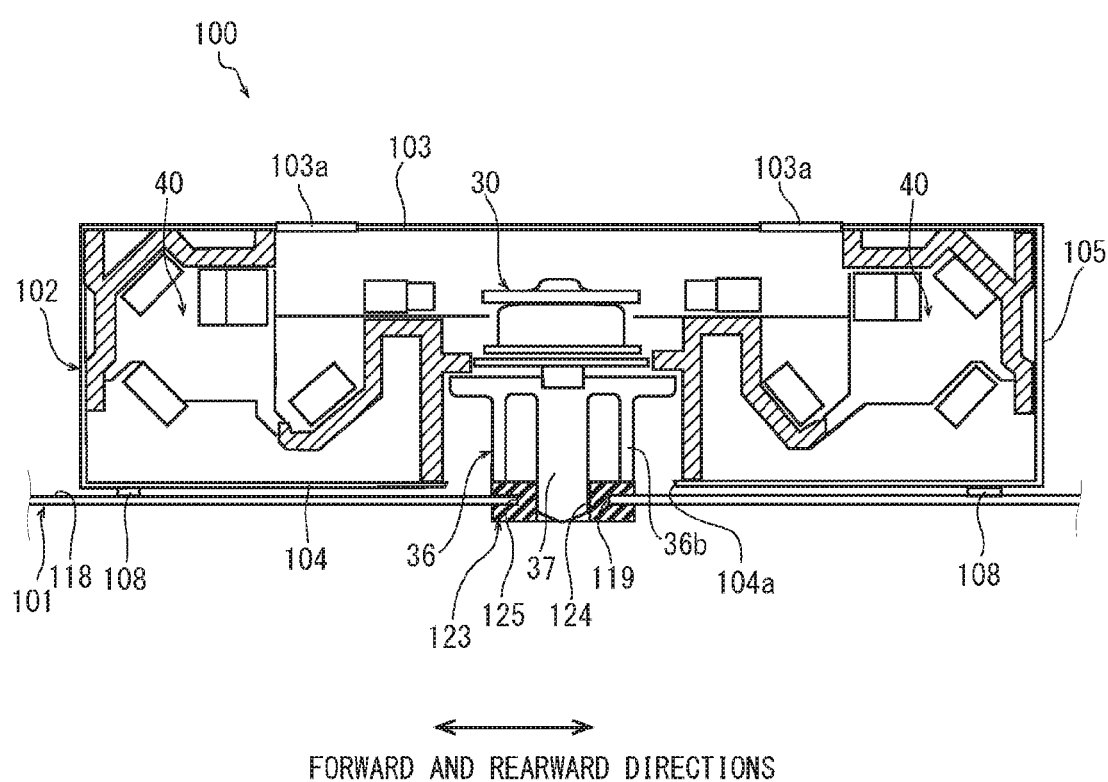
FIG. 6 is a sectional side view showing the scanning optical device of the color printer according to the second embodiment of the present invention.

The scanning optical device 100, as shown in FIG. 6, has two light sources (not shown), a deflector 30, a heat sink 36, a pair of optical components groups 40, and an optical box 102 in which the light sources and the deflector 30, the heat sink 36, and the pair of optical components groups 40 are housed. The light sources, the heat sink 36, the deflector 30 and the optical components groups 40 are the same as those of the first embodiment, and a detail description is omitted.

The optical box 102 is a shallow box-shaped member having a rectangular planar shape, and includes a top plate 103, a bottom plate 104, and side plates 105. The optical box 102 is made of a resin.

In the top plate 103 of the optical box 102, windows 103a through which laser light emitted from the respective optical components groups 40 to the photosensitive drum 10 passes are formed.

In the bottom plate 104 of the optical box 102, a rectangular opening 104a having the same shape as a planar shape of the heat sink 36 is formed at a position corresponding to the heat sink 36. From this opening 104a, the first protrusion 37 of the heat sink 36 protrudes downward.

As shown in FIG. 5, on a back face of the bottom plate 104 of the optical box 102, second left and right columnar protrusions 107L, 107R protruding downward are formed. The second left and right protrusions 107L, 107R are disposed on an extension line extending in the main scanning direction (left and right directions) and passing through the first protrusion 37, and on the both left and right side ends sandwiching the first protrusion 37. On the back face of the bottom plate 104, three abutment parts 108 protruding downward are further formed. The respective abutment parts 108 are protrusions having a spring compressibility in the vertical direction, and are disposed at the front right corner, the rear right corner and at a position slightly rearward from a center of the left edge of the bottom face of the bottom plate 104. Further, on the bottom face of the bottom plate 104, two columnar protrusions 109 protruding downward are formed at the front left corner and the rear left corner.

The frame 101 has a rectangular planar shape elongated in the forward and rearward direction of the color printer 1 so that two scanning optical devices 100 can be disposed side by side in the forward and rearward directions. The frame 101 has: a rectangular bottom plate 111; a front side plate 112 and a rear side plate 113 respectively erected from the front and rear edges of the bottom plate 111; and a left side plate 114 and a right side plate 115 respectively erected from the left and right edges of the bottom plate 111. A height of the front and rear side plates 112, 113 is formed to be higher than a height of the left and right side plates 114, 115.

In the bottom plate 111 of the frame 101, a shallow recess 116 extending in the left and right directions is formed at a center in the forward and rearward direction. A front side face and a rear side face from this recess 116 are front and rear mounting faces 117, 118 to which the scanning optical device 100 is mounted, respectively.

The rear mounting face 118 is formed with a first engaging hole 119 near a center in the forward and rearward directions and in the left and right directions. The first engaging hole 119 has a circular shape of a larger diameter than a diameter of the first protrusion 37 of the heat sink 36, so that the first protrusion 37 of the heat sink 36 is inserted through the first engaging hole 119. Further, the rear mounting face 118 is formed with second left and right engaging holes 120L, 120R. The second left and right engaging holes 120L, 120R are disposed on an extension line extending in the main scanning direction (left and right directions) and passing through the first engaging hole 119 and on the both left and right side ends sandwiching the first engaging hole 119. The second left engaging hole 120L is formed in a long hole elongated in the main scanning direction, and the second right engaging hole 120R is formed in a circular shape. Into the second left and right engaging holes 120L, 120R, second left and right protrusions 107L, 107R of the optical box 102 are respectively inserted. The front mounting face 117 has the same structure as well.

Further, the rear mounting face 118 is formed with three spring seats 121. The respective spring seats 121 are disposed at the front right corner, the rear right corner and at a position slightly rearward from the center of the left edge of the rear mounting face 118. The spring seat at the front left corner is formed in the recess 116. Three abutment parts 108 of the optical box 102 respectively abut against the respective spring seats 121.

Between the first protrusion 37 of the heat sink 36 and the first engaging hole 119 of the frame 101, an elastic member 123 is interposed. The elastic member 123 is a thin cylindrical member (grommet), and is made of a butyl rubber. On a center axis of the elastic member 123, a through hole 124 is formed. A diameter of the through hole 124 is formed to be slightly smaller than a diameter of the first protrusion 37. Also, an annular groove 125 is formed along an outer circumferential face of the elastic member 123. A width of the groove 125 is formed to be slightly smaller than a thickness of the frame 101. On an upper face of the elastic member 123, hemispheric protrusions 126 protruding upward are formed at equal intervals along a circumferential direction.

In a case where the scanning optical device 100 including the above-mentioned construction is mounted to the frame 101, the first protrusion 37 of the heat sink 36 disposed in the optical box 102 is inserted into the though hole 124 of the elastic member 123 and then lower faces of the fins 36b of the heat sink 36 are abutted against an upper face of the elastic member 123. At this juncture, the lower face of each fin 36b abuts against the upper face of each protrusion 126 of the elastic member 123. Since the diameter of the through hole 124 of the elastic member 123 is slightly smaller than the diameter of the first protrusion 37, the elastic member 123 is compressed in a radial direction. Then, the elastic member 123 is elastically deformed and engaged into the first engaging hole 119 of the rear mounting face 118 of the frame 101, and the frame 101 around the first engaging hole 119 is pinched in the groove 125 of the elastic member 123. Since the width of the groove 125 is slightly smaller than the thickness of the frame 101, the elastic member 123 is compressed in the height direction of the groove 125, that is, in the axial direction of the first protrusion 36.

Next, the second left and right protrusions 107L, 107R of the optical box 102 are respectively engaged with the second left and right engaging holes 120L, 120R, and the three abutment parts 108 are respectively abutted against the spring seats 121. The second right protrusion 107R engaged with the second right engaging hole 120R is unmovable in the main scanning direction and in the direction orthogonal to the main scanning direction. On the other hand, the second left protrusion 107L engaged with the second left engaging hole 120L is movable along the left engaging hole 120L formed in a long hole elongated in the main scanning direction. In this manner, the optical box 102 is positioned in the frame 101 with reference to the second protrusion 107R engaged with the second right engaging hole 120R, and is deformable with reference to the second protrusion 107R in the main scanning direction, that is, in a longer direction of the second left engaging hole 120L.

As described above, with the scanning optical device 100 of the color printer according to the second embodiment of the present invention, when the color printer 1 is activated and then the deflector 30 rotates, the generated vibration is transmitted to the heat sink 36. Since the elastic member 123 is interposed between the fin 36b and the first protrusion 37 of the heat sink 36 and the frame 101, the vibration is absorbed by the elastic member 123. Also, since the elastic member 123 is compressed in the radial direction and in the axial direction, a horizontal component and a vertical component of the vibration generated from the deflector 30 can be restricted by the elastic member 123. Therefore, a good image free of jitter or banding or the like can be obtained. Note the first protrusion 37 is intended to absorb the vibration through the elastic member 123 and does not act on positioning of the optical box 102.

Further, since the elastic member 123 is disposed inside of a triangular region R connecting the centers of the three abutment parts 108, in other words, in a region which is an antinode of vibration of the optical box 102, the vibration can be effectively restricted.

Further, the vicinities of the centers of the front and rear mounting faces 117, 118 of the frame 101 have a comparatively high rigidity. Since the deflector 30 is disposed at the vicinity, a high positioning precision can be obtained.

Further, since the elastic member 123 is made of a butyl rubber having a comparatively high rubber hardness of 60 degrees to 90 degrees and a low resilience, an excellent vibration absorbing performance can be obtained.

In the embodiment, the deflector 30 is mounted to the heat sink 36, the first protrusion 37 is formed in the heat sink 36 on the extension line of the rotating shaft of the deflector 30, and the elastic member 123 is interposed between the first protrusion 37 and the frame 101. However, the first protrusion 37 may be provided on the bottom plate 104 of the optical box 102 on the extension line of the rotating shaft of the deflector 30 in place of the heat sink 36. In this case, the elastic member 123 is interposed between the first protrusion provided on the bottom plate 104 and the first engaging hole 119 of the frame 101.

In the embodiment, at the front left corner and the rear left corner of the back face of the bottom plate 104 of the optical box 102, elastic members may be respectively interposed. In this case, the elastic members can be thin pieces made of a butyl rubber. Since the front left corner and the rear left corner of the back face of the bottom plate 104 of the optical box 102 are outside of the triangular region R connecting the centers of the three abutments 108 and do not abut against the frame 101, these corners are easily to be vibrated. Therefore, the elastic members are respectively interposed at the front left corner and the rear left corner of the back face of the bottom plate 104, whereby the vibration is absorbed to be able to restrict the vibration of the entire optical box 102.

The embodiments of the present disclosure were described in a case of applying the configuration of the present disclosure to the printer 1. On the other hand, in another embodiment, the configuration of the disclosure may be applied to another image forming apparatus, such as a copying machine, a facsimile or a multifunction peripheral, except for the printer 1.

While the present disclosure has been described with reference to the particular illustrative embodiments, it is not to be restricted by the embodiments. It is to be appreciated that those skilled in the art can change or modify the embodiments without departing from the scope and spirit of the present disclosure.

The invention claimed is:

1. An image forming apparatus comprising:
a scanning optical device; and
a frame to which the scanning optical device is mounted, the scanning optical device including:
   a light source;
   a deflector configured to rotate around a rotating shaft extending in a vertical direction to deflect light emitted from the light source;
   optical component groups configured to be disposed around the deflector and to focus the light deflected by the deflector on a surface of an image carrier; and
   an optical box in which the light source, the deflector, and the optical components groups are housed, the optical box being supported by the frame,
wherein a heat sink is disposed between the deflector and the frame,
   a first protrusion extending on an extension line of the rotating shaft of the deflector is formed in the heat sink, and
   a first engaging hole with which the first protrusion engages is formed in the frame.

2. The image forming apparatus according to claim 1, wherein the deflector is disposed near a center of the optical box.

3. The image forming apparatus according to claim 1, wherein the first engaging hole is formed in a long hole elongated in a main scanning direction of the scanning optical device or in a direction orthogonal to the main scanning direction.

4. The image forming apparatus according to claim 3, wherein a second protrusion is formed in the optical box, and a second engaging hole with which the second protrusion engages is formed in the frame, and
the second protrusion is formed on an extension line extending in a direction orthogonal to a longer direction of the first engaging hole and passing through the first protrusion, and the second engaging hole is formed in a long hole elongated in the direction orthogonal to the longer direction of the first engaging hole.

5. The image forming apparatus according to claim 1, wherein an elastic member is interposed between the optical box and the frame or between the heat sink and the frame.

6. The image forming apparatus according to claim 5, wherein the elastic member has a rubber hardness of 60 degrees to 90 degrees.

7. The image forming apparatus according to claim 5, wherein the elastic member has a thermal conductivity.

8. The image forming apparatus according to claim 5, wherein the elastic member is interposed between the first protrusion of the heat sink and the first engaging hole of the frame.

9. The image forming apparatus according to claim 8, wherein the elastic member has a cylindrical shape into which the first protrusion of the heat sink can be inserted.

10. The image forming apparatus according to claim 8, wherein the elastic member is made of a butyl rubber.

11. The image forming apparatus according to claim 8, wherein the elastic member is interposed in a compressed state in an axial direction of the rotating shaft of the deflector and in a radial direction orthogonal to the axial direction.

12. The image forming apparatus according to claim 5, wherein three abutment parts abutting against the frame are formed in the optical box, and the elastic member is disposed inside of a triangular region connecting centers of the three abutment parts.

\* \* \* \* \*